US008896882B2

(12) United States Patent
Nakata

(10) Patent No.: US 8,896,882 B2
(45) Date of Patent: Nov. 25, 2014

(54) IMAGE FORMING APPARATUS AND COMPUTER READABLE RECORDING MEDIUM STORING CONTROL PROGRAM FOR PRINTING DISPLAYED IMAGE FROM PORTABLE DISPLAY TERMINAL

(71) Applicant: Masaki Nakata, Fuchu (JP)

(72) Inventor: Masaki Nakata, Fuchu (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 23 days.

(21) Appl. No.: 13/711,871

(22) Filed: Dec. 12, 2012

(65) Prior Publication Data

US 2013/0155429 A1    Jun. 20, 2013

(30) Foreign Application Priority Data

Dec. 20, 2011    (JP) .................................. 2011-278422

(51) Int. Cl.
*H04N 1/60* (2006.01)
*H04N 1/44* (2006.01)
*H04N 1/04* (2006.01)
*H04N 1/00* (2006.01)
*H04N 1/10* (2006.01)

(52) U.S. Cl.
CPC ............. *H04N 1/60* (2013.01); *H04N 1/4433* (2013.01); *H04N 1/10* (2013.01); *H04N 2201/0067* (2013.01); *H04N 2201/0094* (2013.01); *H04N 1/04* (2013.01); *H04N 1/00127* (2013.01); *H04N 2201/0438* (2013.01)
USPC ........................... 358/1.9; 358/1.15; 358/1.18

(58) Field of Classification Search
None
See application file for complete search history.

(56) References Cited

U.S. PATENT DOCUMENTS

| 7,239,416 | B2 * | 7/2007 | Ohmura et al. | 358/1.18 |
| 8,190,048 | B2 * | 5/2012 | Suzuki | 399/81 |
| 8,400,652 | B2 * | 3/2013 | Izawa | 358/1.15 |
| 8,593,658 | B2 * | 11/2013 | Sato | 358/1.14 |
| 2007/0086051 | A1 * | 4/2007 | Kunori | 358/1.15 |
| 2008/0130071 | A1 | 6/2008 | Katsuyama | |
| 2009/0009829 | A1 | 1/2009 | Katsuyama | |
| 2012/0113449 | A1 * | 5/2012 | Ray | 358/1.13 |

FOREIGN PATENT DOCUMENTS

| JP | 2008-141590 A | 6/2008 |
| JP | 2009-4980 A | 1/2009 |
| JP | 2010-212743 A | 9/2010 |

OTHER PUBLICATIONS

An English Translation of the Office Action (Notification of Reason for Refusal) issued on Feb. 18, 2014, by the Japan Patent Office in corresponding Japanese Patent Application No. 2011-278422 (2 pages).

* cited by examiner

*Primary Examiner* — Dung Tran
(74) *Attorney, Agent, or Firm* — Buchanan Ingersoll & Rooney PC

(57) ABSTRACT

An image forming apparatus of the present invention determines whether or not electronic information on a displayed image on a portable display terminal set on a platen can be received from outside of the image forming apparatus, and generating converted data for printing by receiving said electronic information and converting it into a printable format when it is determined that the electronic information can be received (S118 or S119). Meanwhile, the image forming apparatus generates scanned data for printing by scanning the displayed image on platen when it is determined that the electronic information cannot be received from outside (S121 or S123). The image forming apparatus then prints the displayed image based on either converted data or the read data (S124).

20 Claims, 6 Drawing Sheets

I

| Copying | Color | Permitted |
| --- | --- | --- |
| | Maximum number | 50 |
| | Total number | 20 |
| | Black and white | Not permitted |
| | Maximum number | None |
| | Total number | 10 |
| Printing out | Color | Permitted |
| | Maximum number | 100 |
| | Total number | 100 |
| | Black and white | Permitted |
| | Maximum number | 80 |
| | Total number | 50 |
| ⋮ | ⋮ | ⋮ |

S

IMAGE FORMING APPARATUS AND COMPUTER READABLE RECORDING MEDIUM STORING CONTROL PROGRAM FOR PRINTING DISPLAYED IMAGE FROM PORTABLE DISPLAY TERMINAL

CROSS-REFERENCE TO RELATED APPLICATION

This application is based on Japanese Patent Application No. 2011-278422 filed on Dec. 20, 2011, the contents of which are incorporated herein by reference.

BACKGROUND

1. Technical Field

The present invention relates to an image forming apparatus for printing a displayed image on a display medium such as a portable display terminal.

2. Description of Related Arts

In recent years, portable display terminals such as an electronic paper device have been prevailing as office devices. Most of portable display terminals have a function of adding an input image handwritten by a user on a display screen, to an original image based on document data or the like received from a personal computer, a server or the like, and displaying an output image including the handwritten input image. Such a function is generally called "handwriting input function."

As a method for printing a displayed image on an electronic paper device which includes an input image added thereto by means of the handwriting input function, using an image forming apparatus such as an MFP (Multi-Function Peripheral), there are two alternatives. In the first method, as is the case in copying of a paper document, an electronic paper device is set on a platen of a scanner so that the displayed image can be read. In the second method, as is the case in outputting of document data created on a personal computer, document data stored in a electronic paper device is transmitted to an image forming apparatus via a network, and the received data is converted into a printable format. In relation to those methods, Japanese Patent Application Publication No. 2008-141590 proposes an image forming apparatus which determines the type of a medium (i.e. printing paper or electronic paper device) by checking whether or not a printing document is electrically conductive, and controls various operations such as document transfer operations performed by an ADF (Auto Document Feeder) and document reading operations performed by a scanner on the basis of the determination result.

According to the first printing method, a user just has to perform the same tasks as in the case of usual copying, and hence bearing a reduced burden. However, this method may present a problem of degraded image quality as resolution of an electronic paper device is generally lower than resolution of an image forming apparatus. According to the second printing method, high quality images can be obtained but a user is compelled to perform a special task of manipulating the electronic paper device, file server and the like, thereby bearing an increased burden. Furthermore, in a recent office environment, there are various operational restrictions such as the maximum allowable number of copying or printing that is allocated to each user. For this reason, each user needs to precisely know details of the operational restrictions imposed on himself/herself no matter which of those alternatives is taken, thereby bearing further increased burden after all.

The present invention has been made in view of the aforementioned problems. Accordingly, the present invention is intended to provide an image forming apparatus which can ensure a high-quality printed output of a displayed image on a portable display terminal without increasing a burden on a user.

SUMMARY

In order to achieve at least one of the aforementioned objectives, an image forming apparatus for printing a displayed image on display media including a portable display terminal set on a platen, which reflects one aspect of the present invention, comprises a control unit, a conversion unit, a scanning unit, and a printing unit.

The control unit determines whether or not electronic information on the displayed image can be received from outside of the image forming apparatus. The conversion unit generates converted data for printing the displayed image by receiving the electronic information from outside of the image forming apparatus and then converting the electronic information into a printable format when it is determined that the electronic information can be received from outside. The scanning unit generates scanned data for printing the displayed image by scanning the displayed image when it is determined that the electronic information cannot be received. The printing unit prints the displayed image based on either the converted data generated by the conversion unit or the scanned data generated by the scanning unit.

Preferably, operational restrictions may be imposed on the image forming apparatus so that only a predetermined range of operations of the image forming apparatus are permitted, and the conversion unit may generates the converted data only when printing of the displayed image based on the converted data is permitted under the operational restrictions.

Preferably, the scanning unit may further generate scanned data when printing of the displayed image based on the converted data is not permitted under the operational restrictions, and printing of the displayed image based on the scanned data is permitted under the operational restrictions.

Preferably, the conversion unit may generates the converted data for color printing only when color printing of the displayed image based on the converted data is permitted under the operational restrictions.

Preferably, the scanning unit may further determine whether or not the displayed image is a color image while scanning the displayed image, and the conversion unit may generate the converted data for color printing only when it is determined that the displayed image is a color image.

Preferably, printing based on the converted data may only be permitted within a limit of predefined maximum number of printing based on the converted data under the operational restrictions, and the conversion unit may generates the converted data only when total number of printing based on the converted data does not exceed the maximum number of printing.

Preferably, the maximum number of printing may be defined for each of black-and-white printing and color printing based on the converted data, and the conversion unit may generate the converted data for color printing only when the total number of color printing based on the converted data does not exceed the maximum number for color printing.

Preferably, the portable display may be an electronic paper device.

The objectives, features and characteristics of the present invention other than those set forth above will become apparent from the descriptions given below with reference to preferred embodiments illustrated in the accompanying drawings.

DETAILED DESCRIPTION

Figure 1:
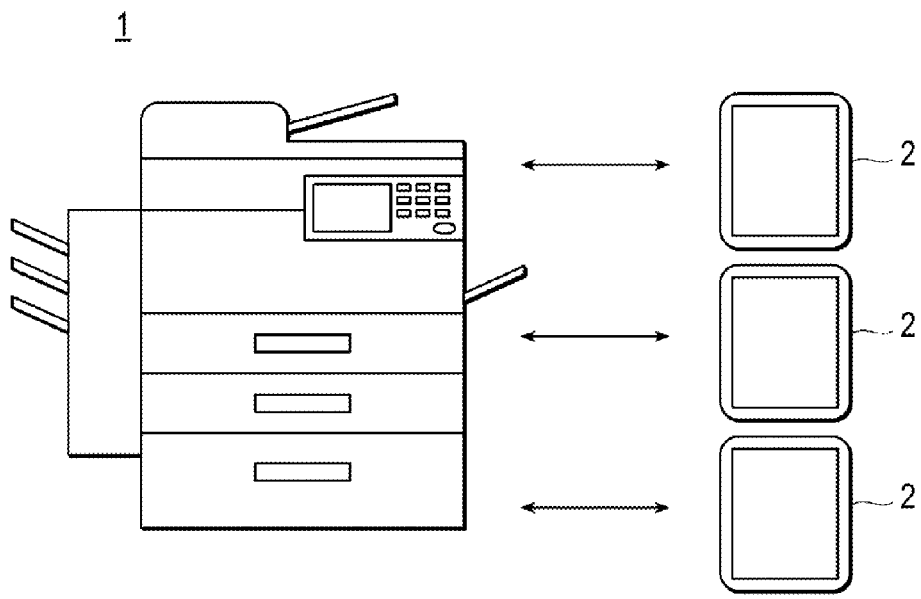
FIG. 1 is a block diagram illustrating a configuration of a system including an image forming apparatus according to one embodiment of the present invention.

The embodiment of the present invention will be described in detail with reference to the accompanying drawings. FIG. 1 is a block diagram illustrating a configuration of an entire system including an image forming apparatus according to one embodiment of the present invention. As illustrated in FIG. 1, the system includes an MFP 1 serving as the image forming apparatus, and an electronic paper device 2 serving as a portable display terminal used by each user of the MFP 1. The MFP 1 and the electronic paper device 2 can exchange signals via wireless communications.

Figure 2:
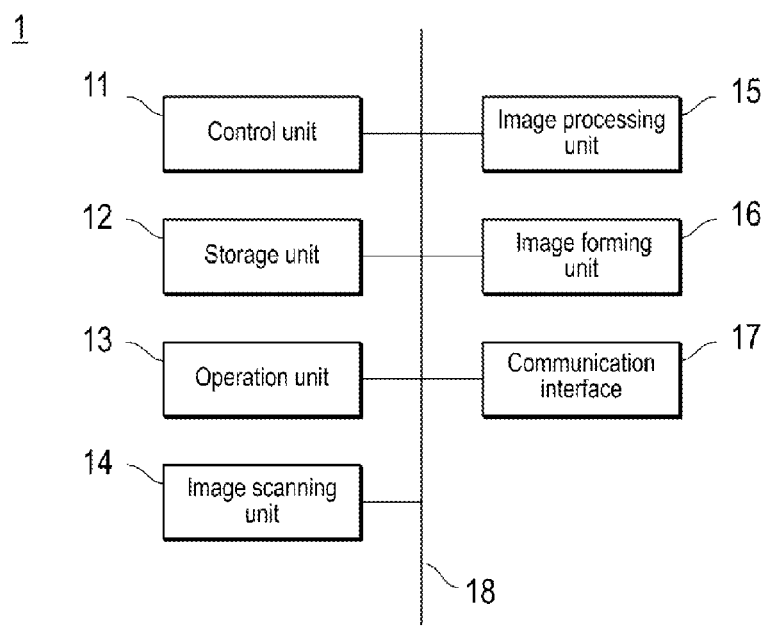
FIG. 2 is a block diagram illustrating a configuration of an image forming apparatus according to one embodiment of the present invention.

FIG. 2 is a block diagram illustrating a configuration of the MFP 1. As illustrated in FIG. 2, the MFP 1 includes a control unit 11, a storage unit 12, an operation unit 13, an image scanning unit 14, an image processing unit 15, an image forming unit 16, and a communication interface 17. These elements are connected one another so that they can exchange signals via a bus 18 for intercommunication.

The control unit 11 is a CPU (Central Processing Unit), it controls operations of the above-described elements in accordance with control programs and performs various arithmetic processes. The storage unit 12 is a storage area which includes a ROM (Read Only Memory) storing control programs, parameters and the like for controlling basic operations of the MFP 1, a RAM (Random Access Memory) serving as a working area for temporarily storing control programs and the like, and an HDD (Hard Disk Drive) storing an operating system (OS), control programs and the like. Particularly, the HDD in the storage unit 12 stores a user database to be described later.

The operation unit 13 is an operation panel, and it displays status information and the like of the MFP 1, and receives various operational instructions from a user. Particularly, the operation unit 13 is provided with a "Start" button for receiving an operational instruction to print out a displayed image on the display medium set on a platen. The term "display medium" in the present embodiment covers both a paper-made medium such as recording paper and a portable display terminal such as an electronic paper device 2. The operation unit 13 displays a UI (User Interface) screen such as a login screen (not illustrated) and a function selection screen (see FIG. 5).

The image scanning unit 14 is a scanner, and it irradiates a display medium which has been manually set on a platen or automatically transferred by an ADF (Automatic Document Feeder) with light emitted from a light source such as a fluorescent lamp, carrying out photoelectric conversion of the reflected light from the display medium using an imaging device such as a CCD (Charge Coupled Device) image sensor, and then converting electric signals resulted from the photoelectric conversion into image data in a printable format. The image scanning unit 14 can therefore generate image data for printing based on the displayed image on the display medium set on the platen. The image data generated by the image scanning unit 14 is hereinafter referred to as "scanned data." Furthermore, the image scanning unit 14 has a function to determine whether or not a displayed image on the platen is a color image in the course of scanning the displayed image.

The image processing unit 15 is a printer controller, and it receives electronic information on a displayed image on the electronic paper device 2 set on the platen and converts the received electronic information into a printable format. Therefore, the image processing unit 15 can generate image data for printing based on the displayed image on the electronic paper device 2 set on the platen. The image data generated by the image processing unit 15 is hereinafter referred to as "converted data."

The image forming unit 16 is a printer engine, and it performs a printing process based on the scanned data or converted data using a publicly known image forming process such as the electro-photographic process. Therefore, the image forming unit 16 can copy or print the displayed image on the display medium set on the platen. Printing of the displayed image based on the scanned data may be hereinafter referred to as "copying" or "copying process" and printing of the displayed image based on the converted data may be referred to as "printing out" or "printing-out process."

The communication interface 17 is a communication module such as NIC (Network Interface Card), and it perform a communication with an external device such as a file server (not illustrated) and the electronic paper device 2 in accordance with a network interface such as Ethernet (registered trademark), token ring and FDDI, or with a wireless communication interface such as Bluetooth (registered trademark), IEEE 802.11, HomeRF and IrDA.

Figure 3:
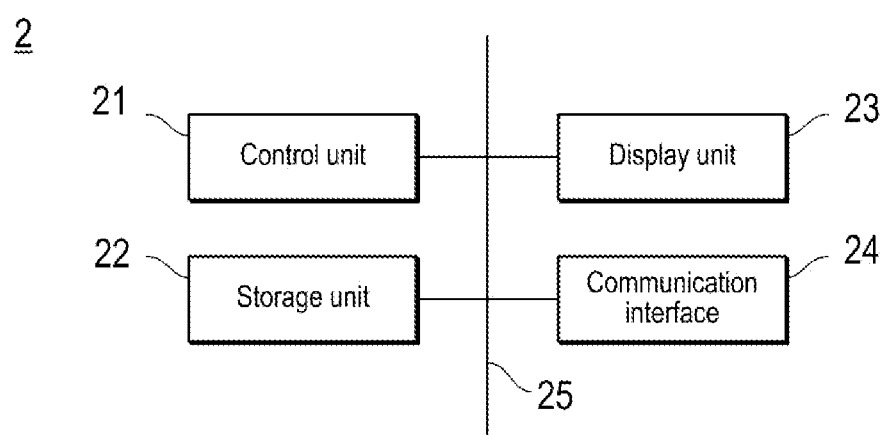
FIG. 3 is a block diagram illustrating a configuration of a portable display terminal according to one embodiment of the present embodiment.

FIG. 3 is a block diagram illustrating a configuration of the electronic paper device 2 according to the present embodiment. As illustrated in FIG. 3, the electronic paper 2 includes a control unit 21, a storage unit 22, a display unit 23, and a communication interface 24. These elements are connected one another so that they can exchange signals via a bus 25 for intercommunication.

The control unit 21 is a CPU (Central Processing Unit), and it controls operations of the above-described elements in accordance with control programs, and performs various arithmetic processes. The storage unit 22 is a storage area which includes, a ROM (Read Only Memory) storing control program, parameters and the like for controlling basic operations of the electronic paper device 2, a RAM (Random Access Memory) serving as a working area for temporarily storing control programs and the like, and an EEPROM (Electrically Erasable and Programmable Read Only Memory) storing an operating system (OS), control programs and the like.

The display unit 23 is a display employing a publicly known display method such as the microcapsule method, the quick-response liquid powder method, the electrophoretic method, the liquid crystal method, and the organic EL method. The display unit 23 displays an image based on electronic information such as document data received from outside. The display unit 23 has a function to add an input image of letters and pictures which are handwritten on the screen by an user manipulating a pen-shaped input device, to the original image based on the received electronica information (hereinafter referred to as "handwriting input" function). The term "displayed image" in the present embodiment means a visual image which actually appears on a display medium such as a sheet of recording paper or the electronic paper device 2, and it also means the original image with the input image added thereto in the case where the input image has been added to the original image by the handwriting input function.

The communication interface 24 is a short range wireless communication module, and it performs a communication with an external device such the MFP 1 in accordance with a wireless communication standard such as Bluetooth (registered trademark), IEEE 802.11, HomeRF and IrDA.

With the above-described configuration, the MFP 1 according to the present embodiment has a function to scan the displayed image on the display medium such as the electronic paper device 2 set on the platen for copying the scanned image as well as a function to receive electronic information on the displayed image on the electronic paper device 2 set on the platen for printing out the received information. In the present embodiment, operational restrictions are imposed on various functions of the MFP 1 such as copying and printing out, and only a predetermined range of operations regarding these functions can be permitted under the operational restrictions. Such operational restrictions are defined for each user of the MFP 1, and the information regarding the operational restrictions for each user is stored as "user restriction information" in the storage unit 12.

Figures 4, 5:
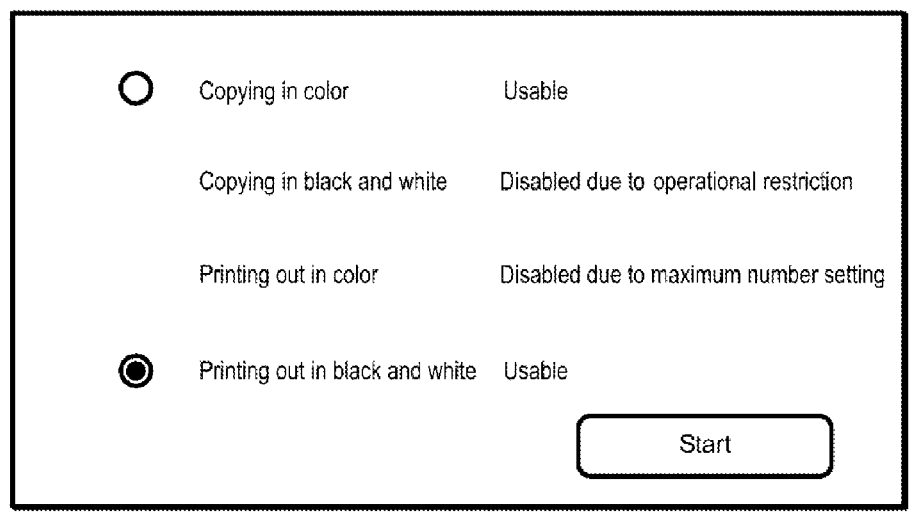
FIG. 4 is a schematic diagram illustrating one example of user restriction information according to one embodiment of the present invention.
FIG. 5 is schematic diagram illustrating one example of a selection screen of operation items according to one embodiment of the present embodiment.

FIG. 4 is a schematic diagram illustrating one example of the user restriction information I according to the present embodiment. As illustrated in FIG. 4, the user restriction information includes information indicating whether or not each of the operation items such as "Copying in color," "Copying in black and white," "Printing out in color," and "Printing out in black and white" regarding the MFP 1's functions including "Copying" and "Printing out" is permitted. Furthermore, the user restriction information I includes detailed contents of the operation items which are permitted under the operational restrictions.

Specifically, in the example of FIG. 4, the user restriction information I includes information indicating the maximum number of printing for each of "Copying in color," "Printing out in color," and "Printing out in black and white" (the maximum number is "50," "100," and "80" respectively). In other words, under the exemplified operational restrictions, copying in color is permitted only when the total number of outputs from copying in color does not exceed the maximum number (i.e. 50). Similarly, printing out in color is permitted only when the total number of outputs from printing out in color does not exceed the maximum number (i.e. 100), and printing out in black and white is permitted only when the total number of outputs from printing out in black and white does not exceed the maximum number (i.e. 80).

The user restriction information I as illustrated in FIG. 4 and the user authentication information to be described later form a part of the user database stored in the storage unit 12. The contents of the user database in the storage unit 12 can be updated by an administrator as appropriate.

Figure 6:
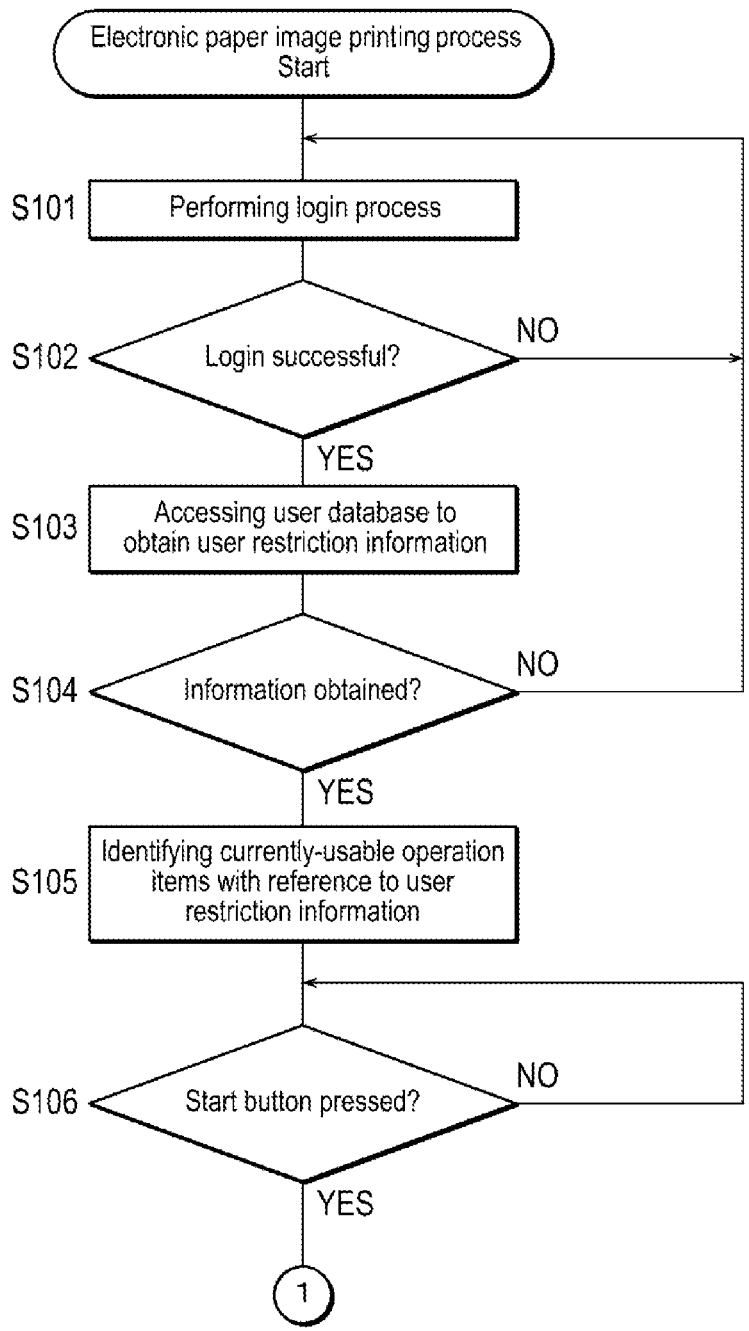
FIG. 6 is a flowchart illustrating an electronic paper image printing process according to one embodiment of the present embodiment.
Figure 7:
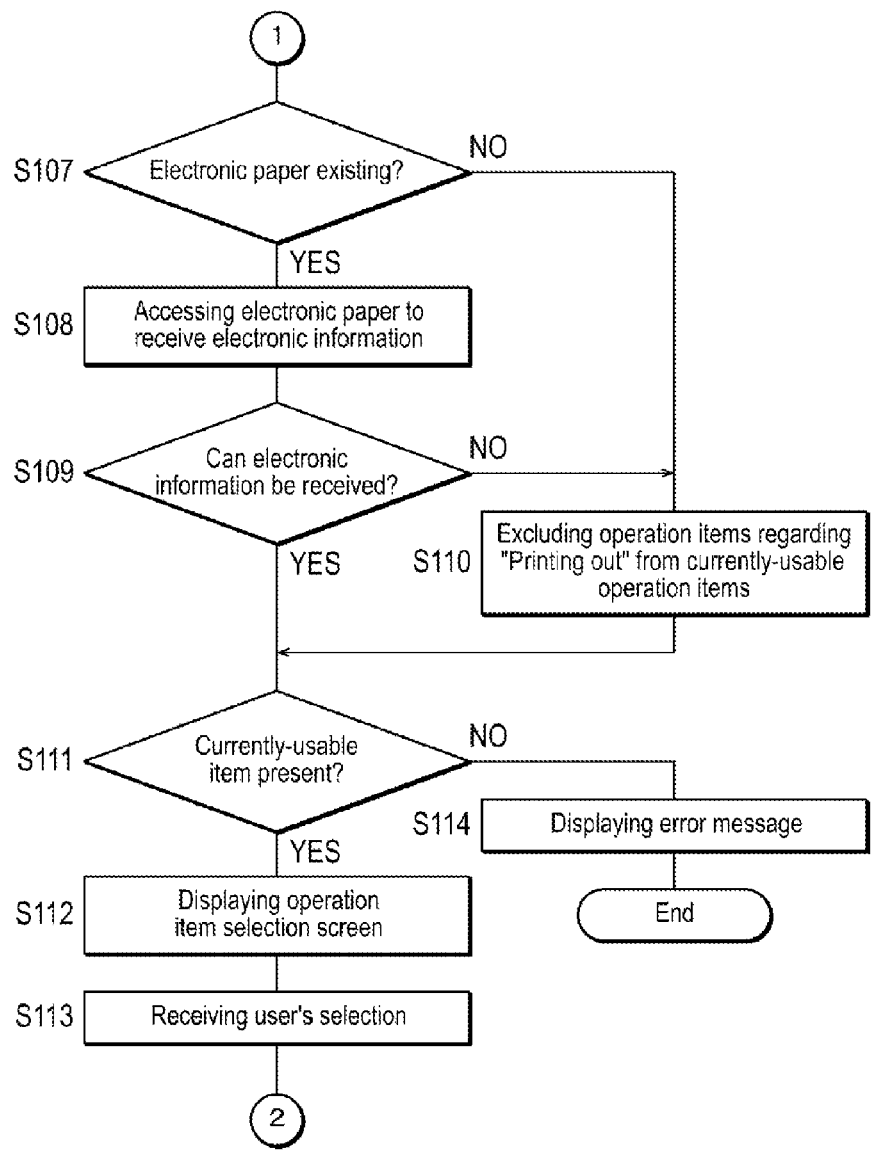
FIG. 7 is a flowchart illustrating an electronic paper image printing process according to one embodiment of the present invention (Continued from FIG. 6).
Figure 8:
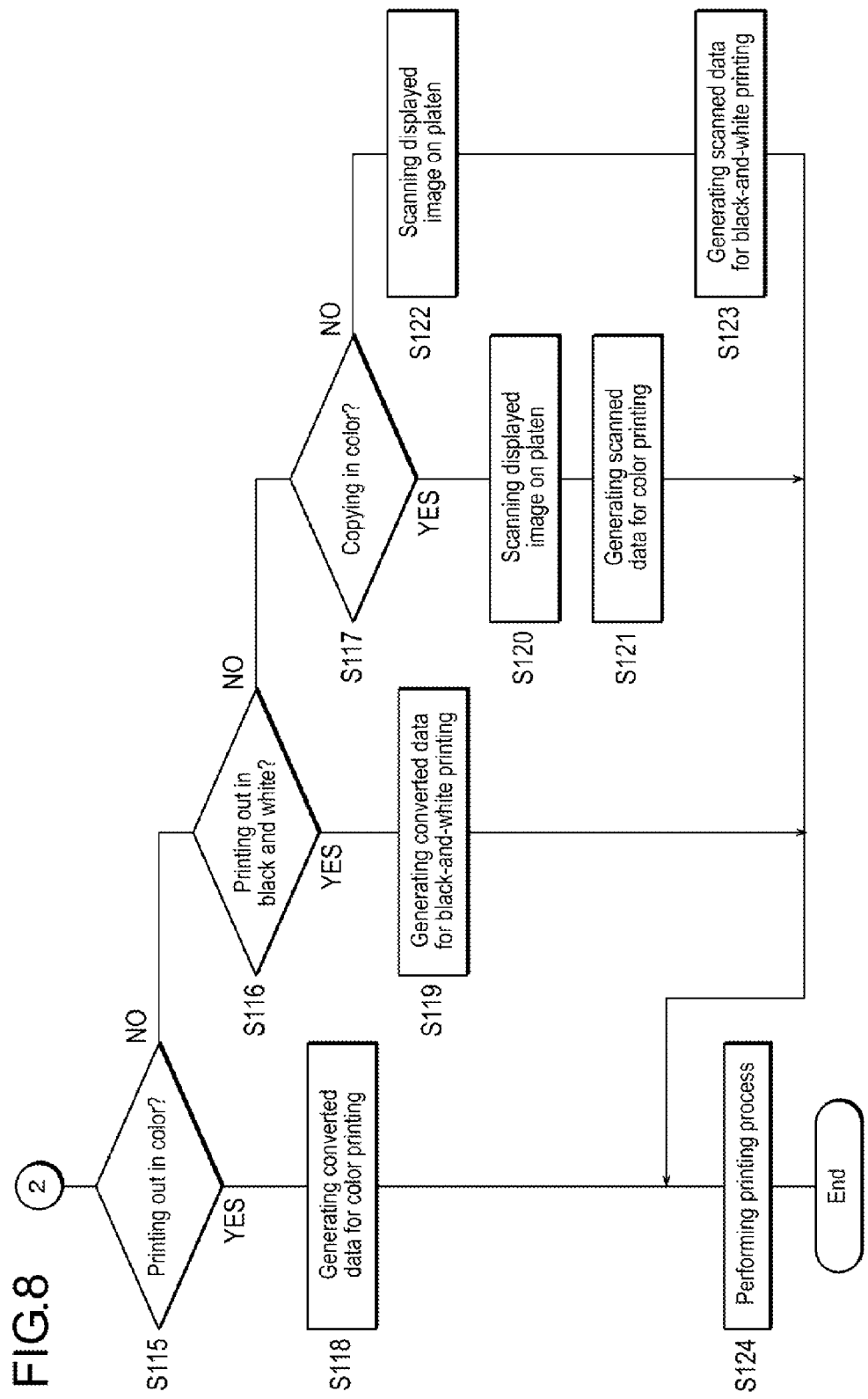
FIG. 8 is a flowchart illustrating an electronic paper image printing process according to one embodiment of the present embodiment (Continued from FIG. 7).

Next, the overview of the operation of the MFP 1 according to the present embodiment will be described. FIG. 6 to FIG. 8 are flowcharts illustrating a process for printing out or copying the displayed image on the electronic paper device 2 onto a sheet of recording paper. This process is hereinafter referred to as "electronic paper image printing process" for simplicity. The algorithm shown in the flowcharts of FIG. 6 to FIG. 8 is stored as a control program in the ROM of the storage unit 12.

As illustrated in FIG. 6, the MFP 1 firstly performs a login process (S101). More specifically, the MFP 1 receives input of user authentication information composed of ID and password at the login screen displayed on the operation unit 13, and then determines whether or not the user is allowed to log in by comparing the input user authentication information with the stored user authentication information in the user database in the storage unit 12.

Instead of receiving input of the user authentication information at the login screen as in the step S101, the MFP 1 can also use a card reader or the like to read user data held in an IC card carried by a user for the login process. Alternatively, the MFP 1 can also use various techniques of biometric authentication such as fingerprint authentication and iris authentication for the login process. The determination of the login authentication can also be performed by an authentication server (not illustrated) connected to the MFP 1 via a network. A user who obtained login permission in the login process is hereinafter referred to as "authenticated user."

When the login process (S101) is successful (S102:YES), the MFP 1 accesses the user database in the storage unit 12 for obtaining the user restriction information I (see FIG. 4) for the authenticated user (S103). When the user restriction information I for the authenticated user is successfully obtained (S104:YES), the MFP 1 proceeds to the step S105 to be described later. When the user restriction information I for the authenticated user fails to be obtained (S104:NO), the MFP 1 displays an error message for notifying the failure on the operation unit 13, and then returns to the step S101. Meanwhile, when the login process is not successful (S102:NO), the MFP 1 displays an error message for notifying the user accordingly on the operation unit 13, and then returns to the step S101.

Subsequently, the MFP 1 identifies currently-usable operation items with reference to the user restriction information I obtained from the storage unit 12 (S105). More specifically, in the step S105, the MFP 1 extracts any operation item from those operation items permitted in the user restriction information I if its total number of printed outputs is smaller than its maximum number of printing, and identifies it as a currently-usable operation item. In the step S105, the image scanning unit 14 can determine whether or not the displayed image on the platen is a color image beforehand, and in this case the MFP 1's operation items regarding color printing (i.e. "Printing out in color" and "Copying in color") will be identified as currently-usable items only when the displayed image is a color image.

Then, the MFP 1 stands by until the start button in the operation unit 13 is pressed (S106:NO). When the start button is pressed (S106:YES), the MFP 1 proceeds to the step S107 to be described later (see FIG. 7). As shown in FIG. 7, the MFP 1 determines whether or not the electronic paper device 2 exists on the platen (S107). More specifically, in the step S107, the MFP 1 determines whether or not the electronic paper device 2 exists on the platen, using a tag reader for detecting a wireless tag installed in the electronic paper device 2. Preferably, at this time, the MFP 1 uses the tag reader to obtain necessary information for accessing the electronic paper device 2 (e.g. identification information and authentication information of the electronic paper 2) at the same time.

When it is determined that the electronic paper device 2 exists on the platen (S107:YES), the MFP 1 then accesses the electronic paper device 2 on the platen to receive electronic information such as document data on the displayed image (S108). When the original electronic information on the displayed image on the electronic paper device 2 is stored in an external device such as a file server, instead of in the electronic paper device 2, the MFP 1 then accesses the external device via a network. Meanwhile, when it is determined that the electronic paper device 2 does not exist on the platen (S107:NO), the MFP 1 excludes the operation items regarding printing out (i.e. "Printing out in color" and "Printing out in black and white" in FIG. 4) from the currently-usable operation items identified in the step S105 (S110), and then proceeds to the step S111 to be described later.

Subsequently, the MFP 1 determines whether or not it can receive the electronic information such as the document data (S109). When the electronic information can be received (S109:YES), the MFP 1 proceeds immediately to the step S111 to be described later. When the electronic information cannot be received (S109:NO), the MFP 1 excludes the operation items regarding printing out (i.e. "Printing in color" and "Printing in black and white" in FIG. 4) from the currently-usable operation items identified in the step S105 (S110), and then proceeds to the step S111 to be described later. Thus, when the electronic information on the displayed image on the electronic paper device 2 cannot be received, the MFP 1 determines that a printing-out process based on the converted data is unavailable, and then performs a copying process based on the scanned data.

Subsequently, the MFP 1 determines whether or not the currently-usable operation items are present (S111). When the currently-usable operation items are present (S111:YES), the MFP 1 notifies a user of a list of the currently-usable operation items, and displays on the operation unit 13, a UI screen for allowing a user to select one of the currently-usable operation items (S112). The UI screen displayed in the step S112 is hereinafter referred to as an "operation item selection screen." Meanwhile, when the currently-usable operation items are not present (S111:NO), the MFP 1 displays on the operation unit 13, an error message for notifying accordingly (S114) before terminating the electronic paper image printing process (End).

FIG. 5 is schematic diagram illustrating one example of the operation item selection screen S corresponding to the user restriction information I in FIG. 4. In the example of FIG. 5, "Copying in color" and "Printing out in black and white" are made "Usable" out of "Copying in color," "Copying in black and white," "Printing in color," and "Printing in black and white." Meanwhile, "Copying in black and white" is made "Disabled due to operational restriction" as this operation item is made "Not permitted" in the user restriction information I. Furthermore, "Printing out in color" is made "Disabled due to maximum number setting" as the maximum number of printing for this operation item is made "100" in the user restriction information I and the total number of printing so far has already reached the maximum number of printing.

When it is determined in the step S109 that the electronic information such as document data cannot be received (S109:NO), the MPF 1 excludes the operation items regarding printing out from the currently-usable operation items (S110), and hence displays a message of "Disabled due to data reception failure" with respect to "Printing out in color" and "Printing out in black and white" out of the operation items shown in FIG. 4 or even hides "Printing out in color" and "Printing out in black and white" from the selection screen.

As illustrated in FIG. 5, the operation item selection screen S is provided with input means which include radio buttons corresponding to the currently-usable operation items as well as an execution button for executing the selected operation item among the radio buttons ("Start" button in the drawing). A user can manipulates the input means to order to select one operation item among those included in the list of the currently-usable operation items. As described above, the MFP 1 performs a printing-out process based on the converted data generated by the image processing unit 15 when it is determined that the electronic information on the displayed image on the electronic paper device 2 can be received from outside. In other words, when "Printing out in color" or "Printing out in black and white" are made selectable in the operation item selection screen S, a user can select any one of them in order to obtain a high-quality printed output of the displayed image of the electronic paper device 2.

Subsequently, the MFP 1 receives user's selection of any one operation item on the operation item selection screen S (S113), and then proceeds to the step 114 to be described later (see FIG. 8). The selected operation item in the operation item selection screen S is hereinafter referred to as "selected item." Instead of receiving user's selection of the operation item in the step S113, the MFP 1 can also determine the operation item to be selected in accordance with a priority order which is allocated to each of the operation items. For example, according to the user restriction information I in FIG. 4 where priorities in descending order are "Printing out in color," "Copying in color," "Printing out in black and white," and "Copying in black and white," the operation item "Copying in color" with the highest priority is automatically selected among the currently-usable operation items, and no such selection screen as the screen S shown in FIG. 5 is displayed.

As shown in FIG. 8, the MFP 1 determines whether or not the selected item in the step S113 is "Printing out in color," "Printing out in black and white," or "Copying in color" in sequence (from S115 to S117). When the user's selected item is "Printing out in color" (S115:YES), the MFP 1 converts the electronic information received from the electronic paper device 2 into a printable format in order to generate converted data for color printing (S118). Then, the MFP 1 proceeds to the step S124 to be described later.

When the user's selected item is "Printing out in black and white" (S116:YES), the MFP 1 converts the electronic information received from the electronic paper device 2 into printable format in order to generate converted data for black-and-white printing (S119). Then, the MFP 1 proceeds to the step S124 to be described later. When the user's selected item is "Copying in color" (S117:YES), the MFP 1 scans the displayed image set on the platen in order to obtain the electronic information on the displayed image (S120), and converts the obtained electronic information into a printable format in order to generate scanned data for color printing (S121). Then, the MFP 1 proceeds to the step S124 to be described later.

Meanwhile, when the user's selected item is neither "Printing out in color," "Printing out in black and white," nor "Copying in color" (S117:NO), i.e., when the user's selected item is "Copying in black and white," the MFP 1 scans the displayed image set on the platen in order to obtain the electronic information on the displayed image (S122), and converts the obtained electronic information into a printable format in order to generate scanned data for black-and-white printing (S123). Then, the MFP 1 proceeds to the step S124 to be described later.

The MFP 1 performs printing process of the displayed image set on the platen based on either the converted data generated in the step S118/S119, or the scanned data generated in the step S121/S123 (S124). Then, the MFP 1 terminates the electronic paper image printing process (End).

As described above, the MFP 1 in the present embodiment can convert electronic information on the displayed image set on the platen into a printable format and print out the displayed image based on the resulting printable data in accordance with user's selection in the operation item selection screen S, in the case where the electronic information can be received from outside. Meanwhile, the MFP 1 will scan the displayed image set on the platen in order to copy it in the case where electronic information on the displayed image cannot be received. Accordingly, the MFP 1 in the present embodiment can ensure a high-quality printed output of the displayed image on the electronic paper device 2 without increasing a burden on a user, in the case where electronic information on the displayed image can be received from outside of the MFP 1.

The MFP 1 in the present embodiment can also identify the currently-usable operation items with reference to the user restriction information I and print the displayed image in a suitable manner (i.e. either in a printing-out or copying process) without increasing a burden on a user even in the case where a predetermined ranges of MFP 1's operations are permitted due to the user restriction information I. Furthermore, the MFP 1 in the present embodiment can perform a copying process of the displayed images set on the platen instead of a printing-out process, in the case where the latter process is made disabled due to maximum number settings. Accordingly, the MFP 1 of the present embodiment can prevent a situation where all its operation items for printing the displayed image on the electronic paper device 2 are made disabled as long as its operational restrictions are appropriately defined for each user.

The present invention shall not be limited to the aforementioned embodiment, and various modifications can be made within the scope of the appended claims. For example, the types of operation items which can be performed by the image forming apparatus and the types of operational restrictions which are imposed on the image forming apparatus are not limited to those illustrated in FIG. 4. Furthermore, the portable display terminal according to the present invention is not limited to an electronic paper device, and it can be any type of portable display terminal as long as it has an suitable form for being set on a platen of an image forming apparatus and electronic information on its displayed image can be received by the image forming apparatus.

The means and methods for performing various processes in a system containing an image forming apparatus according to the present embodiment can also be implemented by a dedicated hardware circuit or a programmed computer. The aforementioned program can be provided either in the form of a computer-readable recording medium such as a flexible disk and a CD-ROM, or an online downloadable file through a network such as internet. In the former case, the program recorded in the computer readable recording medium is normally transmitted to a memory unit such as a hard disk. The aforementioned program can also take the form of an independent application software or a built-in function of the image forming apparatus.

What is claimed is:

1. An image forming apparatus for printing a displayed image on display media including a portable display terminal set on a platen, comprising:
    a control unit for determining whether or not electronic information on said displayed image can be received from outside of said image forming apparatus;
    a conversion unit for generating converted data for printing said displayed image by receiving said electronic information from outside of said image forming apparatus and converting said electronic information into a printable format when it is determined that said electronic information can be received from outside;
    a scanning unit for generating scanned data for printing by scanning said displayed image when it is determined that said electronic information cannot be received;
    a printing unit for printing said displayed image based on either said converted data generated by said conversion unit or said scanned data generated by said scanning unit;
    a selecting unit for selecting between printing by using said converted data and printing using said scanned data; and
    a display unit:
    (a) when the display media is not the portable display terminal, or when the display media is the portable display terminal and the electronic information cannot be received: the display unit displaying a first set of items which are permitted to be selected for printing by using said scanned data; and
    (b) when the display media is the portable display terminal and the electronic information can be received: the display unit displaying both (i) a second set of items which are permitted to be selected for printing by using said converted data and (ii) the first set of items which are permitted to be selected for printing by using said scanned data;
    wherein the control unit determines whether or not the display media is the portable display terminal.

2. The image forming apparatus according to claim 1, wherein
    operational restrictions are imposed on said image forming apparatus so that only a predetermined range of operations of said image forming apparatus are permitted, and
    said conversion unit generates said converted data only when printing of said displayed image based on said converted data is permitted under said operational restrictions.

3. The image forming apparatus according to claim 2, wherein
    said scanning unit further generates said scanned data when printing of said displayed image based on said converted data is not permitted under said operational restrictions, and printing of said displayed image based on said scanned data is permitted under said operational restrictions.

4. The image forming apparatus according to claim 2, wherein
    said conversion unit generates said converted data for color printing only when color printing of said displayed image based on said converted data is permitted under said operational restrictions.

5. The image forming apparatus according to claim 4, wherein
    said scanning unit further determines whether or not said displayed image is a color image while scanning said displayed image, and said conversion unit generates said converted data for color printing only when it is determined that said displayed image is a color image.

6. The image forming apparatus according to claim 1, wherein
printing of said displayed image based on said converted data may only be permitted within a limit of predefined maximum number of printing under said operational restrictions, and
said conversion unit generates said conversion data only when total number of printing based on said converted data does not exceed said maximum number of printing.

7. The image forming apparatus according to claim 6, wherein
said maximum number of printing is defined for each of black-and-white printing and color printing based on said converted data, and
said conversion unit generates said converted data for color printing only when total number of color printing based on said converted data does not exceed said maximum number for color printing.

8. The image forming apparatus according to claim 1, wherein
said portable display terminal is an electronic paper device.

9. The image forming apparatus according to claim 1, wherein the selecting unit comprises an input device for enabling a user to manually select between printing using said converted data and printing using said scanned data.

10. The image forming apparatus according to claim 1, wherein the selecting unit is programmed such that a method of printing is automatically selected, based on a preprogrammed order of priority, between printing by using said converted data and printing using said scanned data.

11. A nontransitory computer-readable recording medium storing a control program of an image forming apparatus for printing a displayed image on a display media including a portable display terminal set on a platen, said control program causing said image forming apparatus to perform a process comprising steps of:
(A) determining whether or not electronic information on said displayed image can be received from outside of said image forming apparatus;
(B) generating converted data for printing said image data by receiving said electronic information from outside of said image forming apparatus and converting said electronic information into a printable format when it is determined that said electronic information can be received from outside;
(C) generating scanned data for printing by scanning said displayed image when it is determined that said electronic information cannot be received from outside;
(D) printing said displayed image based on either said converted data generated in said step (B) or said scanned data generated in said step (C);
(E) selecting between printing by using said converted data and printing using said scanned data; and
(F) determining whether or not the display media is the portable display terminal; and
(G) (a) when the display media is not the portable display terminal, or when the display media is the portable display terminal and the electronic information cannot be received: displaying a first set of items which are permitted to be selected for printing by using said scanned data; and
(b) when the display media is the portable display terminal and the electronic information can be received: displaying both (i) a second set of items which are permitted to be selected for printing by using said converted data and (ii) the first set of items which are permitted to be selected for printing by using said scanned data.

12. The nontransitory recording medium according to claim 11, wherein
operational restrictions are imposed on said image forming apparatus so that only a predetermined range of operations of said image forming apparatus are permitted, and
said step (B) generates said converted data only when printing of said displayed image based on said converted data is permitted under said operational restrictions.

13. The nontransitory recording medium according to claim 12, wherein
said step (C) further generates said scanned data when printing of said displayed image based on said converted data is not permitted under said operational restrictions, and printing of said displayed image based on said scanned data is permitted under said operational restrictions.

14. The nontransitory recording medium according to claim 12, wherein
said step (B) generates said converted data for color printing only when color printing of said displayed image based on said converted data is permitted under said operational restrictions.

15. The nontransitory recording medium according to claim 14, wherein
said process further comprises a step (E) of determining whether or not said displayed image is a color image while scanning said displayed image, and
said step (B) generates said converted data for color printing only when it is determined in step (E) that said displayed image is a color image.

16. The nontransitory recording medium to claim 11, wherein
printing of said displayed image based on said converted data may only be permitted within a limit of predefined maximum number of printing under said operational restrictions, and
said step (B) generates said converted data only when total number of printing based on said converted data does not exceed said maximum number of printing.

17. The nontransitory recording medium according to claim 16, wherein
said maximum number of printing is defined for each of black-and-white printing and color printing based on said converted data, and
said step (B) generates said converted data for color printing only when total number of color printing based on said converted data does not exceed said maximum number for color printing.

18. The nontransitory recording medium according to claim 11, wherein said portable display terminal is an electronic paper device.

19. The nontransitory recording medium according to claim 11, wherein the selecting step comprises a user manually selecting between printing using said converted data and printing using said scanned data.

20. The nontransitory recording medium according to claim 11, wherein the selecting step comprises automatically selecting, based on a preprogrammed order of priority, between printing by using said converted data and printing using said scanned data.

* * * * *